Dec. 12, 1961   J. A. MARSHALL   3,012,829
FLUID SEAL
Filed June 30, 1958
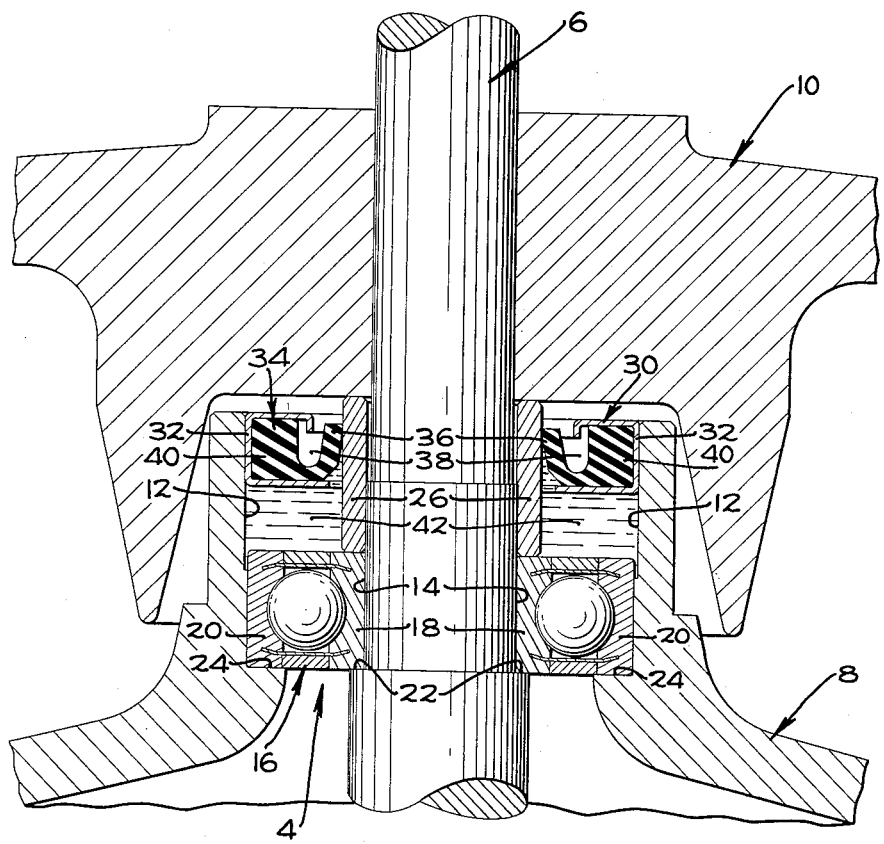
INVENTOR
JAMES A. MARSHALL
BY Hans G. Hoffmeister
ATTORNEY

United States Patent Office 3,012,829
Patented Dec. 12, 1961

3,012,829
FLUID SEAL
James A. Marshall, Hoopeston, Ill., assignor to FMC Corporation, a corporation of Delaware
Filed June 30, 1958, Ser. No. 745,694
3 Claims. (Cl. 308—187.1)

The present invention appertains to fluid seals and more particularly relates to a fluid seal having improved cooling and lubricating characteristics.

Fluid seals of presently known types will not operate satisfactorily in certain heavy duty fluid sealing applications between a rotatable member and a stationary housing, such as, for example, in a garbage disposal unit. The usual cause of seal failure in these heavy duty applications is excessive heating or lack of lubrication of the seal.

It is, therefore, one object of the present invention to provide an improved fluid seal.

Another object is to provide a fluid seal having improved heat transfer characteristics.

Another object is to provide a fluid seal having improved lubricating characteristics.

These and other objects and advantages of the present invention will become apparent from the following description and the drawing which is an axial section through the seal of the present invention.

The fluid seal 4 of the present invention is arranged to prevent leakage between a rotatable member, or shaft 6, and a stationary housing 8, only fragments of the housing 8 and shaft 6 being shown in the drawing. The shaft 6 is driven by a prime mover of any suitable type (not shown) which is connected to the shaft below the seal 4. A driven unit, such as an impeller 10 (only a fragment of which is shown in the drawing), is keyed to the shaft 6 above the seal 4.

The fluid seal 4 includes a counterbored portion 12 of the housing 8 and a reduced diameter portion 14 of the shaft 6. An anti-friction bearing 16 of the single or double sealed type has its inner race 18 press-fitted on the reduced diameter portion 14 of the shaft 6 and has its outer race 20 press fitted in the counter-bored portion 12 of the housing 8. The inner race 18 abuts a shoulder 22 on the shaft 6 and the outer race 20 abuts a shoulder 24 on the housing 8, thereby preventing axial movement of the shaft 6 relative to the housing 8. A spacing ring 26 is secured in press-fit engagement on the reduced diameter portion 14 of the shaft 6 and is arranged to abut the inner race 18 and the impeller 10 to provide a mechanical spacer therebetween.

An annular fluid sealing element 30 is disposed between the spacing ring 26 and the counterbored portion 12 of the housing 8, and comprises a rigid retaining ring 32 and a seal ring 34 of U-shaped cross section. The ring 34 can be of a flexible material such as felt, or it can be of a material that is both resilient and flexible, such as rubber. The rigid retaining ring 32 is held in rigid fluid sealed engagement in the counterbored portion 12 and is spaced from both the spacing ring 26 and the bearing 16. An annular sealing lip 36 of the flexible ring 34 is arranged to be forced in sealing engagement against the rotatable spacer ring 26 by fluid pressure acting in a cavity 38 defined between the lip 36 and a body portion 40 of the flexible ring 34.

An annular cavity 42 is defined between the bearing 16, the spacing ring 26, the lip 36, the retaining ring 32 and the counterbored portion 12 of the housing 8. A petroleum or non-petroleum base lubricant fills the cavity 42 thus forming a reservoir providing both a supply of lubricant and a coolant for the portion of the lip 36 which rides against the spacing ring 26.

In the operation of the fluid seal 4 of the present invention, the shaft 6 is driven by a power unit (not shown) causing the impeller and spacing ring 26 to rotate therewith. The impeller operates in a fluid in the housing 8 (only a portion of which is shown) thereby subjecting the fluid to an increased pressure. This fluid enters the cavity 38 of the flexible ring 34 causing the lip 36 to be deflected against the ring 26 so as to establish fluid sealing engagement therewith. The deflection of the lip 36 tends to compress the lubricant in the cavity 42. The lubricant is preferably in a liquid form and, hence, is non-compresible. Thus, the deflection of the lip causes a film of lubricant to form between the shaft 6 and the lip 36 thereby providing adequate lubrication for the lip 36. The lubricant is preferably of a type having a high coefficient of heat conductivity so that it can conduct heat away from the relatively moving surfaces of the seal 4 which might generate heat and be damaged by such heat if the heat is not suitably dissipated. It is also evident that the non compressible lubricant positively prevents the fluid being pressurized by the impeller 10, which fluid may contain grit, from entering the cavity 42 and the area between the lip 36 and ring 26.

Although the spacing ring 26 has been shown and described, it is to be observed that the fluid seal 4 can operate equally as well without such a ring if the lip 36 is arranged to contact the shaft 6.

From the foregoing description it is apparent that the improved seal of the present invention is suited for heavy duty operation where heat is involved. The lubricant which is enclosed between the bearing and the sealing element provides means for lubricating the sealing element, conducts heat away from the relatively moving sealing surfaces, and prevents the fluid being sealed from flowing past the sealing surfaces.

One of the advantages of the fluid seal of this invention is that the lip is caused to bear against the spacer ring with a force which is directly proportional to the pressure of the sealing fluid acting on the seal. Thus, when the fluid being sealed is subjected only to a low pressure, the lip bears lightly on the spacer ring to provide the proper seal without excessive seal wear. Conversely, when high pressure fluid is being sealed, the lip bears more strongly against the spacer ring to provide the necessary seal.

While one form of the present invention has been shown and described, it will be understood that various changes and modifications may be made therein without departing from the spirit of the invention or the scope of the appended claims.

Having thus described the present invention and the manner in which the same is to be used, what is claimed as new and desired to be protected by Letters Patent is:

1. In a garbage disposal apparatus: a housing having a bore through a wall thereof; a shaft extending through said bore from said housing; a rotary bearing having an outer race, an inner race, and a fluid seal between said inner and outer races; said inner race being pressed over said shaft to a shoulder thereon in sealed relation with the shaft; said outer race being pressed into said bore against a shoulder therein in sealed relation with the housing; a spacer ring having an exterior sealing surface fitted over said shaft against said inner race; a sealing ring having a rigid outer body and a resilient inner lip pressed into said bore with said inner lip stretched in sealing relation about said exterior sealing surface and extending away from said bearing; said bore, said bearing, said spacer ring, and said sealing ring defining a reservoir resiliently closed by said inner lip; an impeller member carried by said shaft in retaining relation with said spacer ring; said impeller member being adapted to effect exertion of fluid pressure against the extending side of said lip when rotated; a quantity of substantially non-compressible liquid lubricant having a high coefficient of heat conductivity and substantially filling said reservoir; said lip being adapted to deflect against said lubricant in response to said fluid pressure to cause a thin film of said lubricant to form between said lip and said sealing surface to provide lubrication and cooling therebetween.

2. In a garbage disposal unit: a housing having a bore through a wall thereof; a shaft extending through said bore; a rotary bearing having an outer race, an inner race, and a fluid seal between said inner and said outer races; said inner race being fitted in sealed relation over said shaft against a shoulder thereon; said outer race being fitted in sealed relation into said bore against a shoulder therein; means on said shaft defining an exterior sealing surface spaced apart from said inner race; a rigid sealing ring having a resilient inner lip and pressed into said bore with said inner lip stretched in sealing relation about said exterior sealing surface and extending away from said bearing; said bore, said bearing said shaft, and said sealing ring defining a reservoir resiliently closed by said inner lip; an impeller member attached to said shaft adjacent said sealing ring; said impeller member being adapted to effect the imposition of fluid pressure against the extending side of said lip when rotated; a quantity of substantially non-compressible liquid lubricant having a high coefficient of heat conductivity and substantially filling said reservoir; said lip being adapted to deflect against said lubricant in response to said fluid pressure to cause a thin film of said lubricant to form between said lip and said sealing surface to provide lubrication and cooling therebetween.

3. In a machine of the type described; a housing having a bore through a wall thereof; a shaft extending from said housing; a rotary bearing having an inner race, an outer race, and a fluid seal between said inner and said outer races; said inner race being pressed over said shaft to a shoulder thereon in sealed relation with the shaft; said outer race being pressed into said bore against a shoulder therein in sealed relation with the housing, means defining an exterior sealing surface disposed around said shaft adjacent said inner race; a sealing ring having a rigid outer body and a resilient inner lip pressed into said bore with said inner lip stretched in sealing relation about said exterior sealing surface and extending away from said bearing; said bore, said bearing, said spacer ring, and said sealing ring defining a reservoir resiliently closed by said inner lip; an impeller member fitted over said shaft into retaining relation with said spacer ring; said impeller member being adapted to cause fluid pressure to be exerted against the extending side of said lip when rotated; a quantity of substantially non-compressible liquid lubricant substantially filling said reservoir; said lip being adapted to deflect against said lubricant in response to said fluid pressure to cause a thin film of said lubricant to form between said lip and said sealing surface, said film of lubricant and said quantity of lubricant conducting frictional heat away from said lip and said sealing surface.

References Cited in the file of this patent

UNITED STATES PATENTS

| | | |
|---|---|---|
| 549,419 | Wright | Nov. 5, 1895 |
| 2,365,046 | Bottomley | Dec. 12, 1944 |
| 2,379,547 | Sperry | July 3, 1945 |
| 2,459,981 | Warren | Jan. 25, 1949 |
| 2,587,405 | Stevens et al. | Feb. 26, 1952 |
| 2,626,840 | Laurent | Jan. 27, 1953 |

FOREIGN PATENTS

| | | |
|---|---|---|
| 523,854 | Great Britain | July 24, 1940 |
| 719,222 | Great Britain | Dec. 1, 1954 |